(12) United States Patent
Hatton et al.

(10) Patent No.: US 11,417,474 B2
(45) Date of Patent: Aug. 16, 2022

(54) HIGH-TEMPERATURE SUPERCAPACITORS CONTAINING SURFACE ACTIVE IONIC LIQUIDS

(71) Applicant: Massachusetts Institute of Technology, Cambridge, MA (US)

(72) Inventors: T. Alan Hatton, Sudbury, MA (US); Xianwen Mao, Ithaca, NY (US); Paul Brown, Boston, MA (US); Margarida Fernandes Da Costa Gomes, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 840 days.

(21) Appl. No.: 16/323,468

(22) PCT Filed: Aug. 4, 2017

(86) PCT No.: PCT/US2017/045509
§ 371 (c)(1),
(2) Date: Feb. 5, 2019

(87) PCT Pub. No.: WO2018/027139
PCT Pub. Date: Feb. 8, 2018

(65) Prior Publication Data
US 2019/0189364 A1    Jun. 20, 2019

Related U.S. Application Data

(60) Provisional application No. 62/371,315, filed on Aug. 5, 2016.

(51) Int. Cl.
*H01G 11/62* (2013.01)
*H01G 9/035* (2006.01)
*H01G 11/64* (2013.01)
*H01G 11/58* (2013.01)

(52) U.S. Cl.
CPC ............ *H01G 11/62* (2013.01); *H01G 9/035* (2013.01); *H01G 11/58* (2013.01); *H01G 11/64* (2013.01)

(58) Field of Classification Search
None
See application file for complete search history.

(56) References Cited

U.S. PATENT DOCUMENTS

| | | | |
|---|---|---|---|
| 2006/0210873 A1 | 9/2006 | Hollenkamp et al. | |
| 2012/0147528 A1 | 6/2012 | Biler et al. | |
| 2013/0180591 A1* | 7/2013 | Kawata | H01G 9/035 136/263 |
| 2014/0102884 A1 | 4/2014 | Miller | |
| 2015/0340168 A1* | 11/2015 | Kwon | H01G 11/54 361/502 |
| 2018/0204689 A1* | 7/2018 | Brambilla | H01G 11/70 |
| 2019/0189364 A1* | 6/2019 | Hatton | H01G 11/64 |

OTHER PUBLICATIONS

International Search Report and Written Opinion for International Application No. PCT/US17/45509 dated Oct. 17, 2017.

* cited by examiner

*Primary Examiner* — Dion R. Ferguson
(74) *Attorney, Agent, or Firm* — Foley Hoag LLP; Dana M. Gordon

(57) ABSTRACT

Disclosed are capacitors containing surface active ionic liquids, and methods of use. The capacitors have high capacitance and function over broad ranges of temperature, and are particularly appropriate for high-temperature (~200° C.) applications.

31 Claims, 9 Drawing Sheets

HIGH-TEMPERATURE SUPERCAPACITORS CONTAINING SURFACE ACTIVE IONIC LIQUIDS

RELATED APPLICATIONS

This application is the National Stage of International Application No. PCT/US2017/045509, filed on Aug. 4, 2017; which claims the benefit of priority to U.S. Provisional Application No. 62/371,315 filed Aug. 5, 2016.

BACKGROUND OF THE INVENTION

Ionic liquids have attracted interest for use in capacitors. Not only do many ionic liquids have favorable capacitative properties, they are non-flammable, practically involatile, have lower conductivities at room temperature, and they have much larger electrochemical windows than water. Some devices containing ILs have been shown to operate at above 100° C., and more recently supercapacitors composed of ILs and clay have been shown to operate at around 200° C., however, the properties of these devices were not particularly favorable. Accordingly, new electrolytes for high-temperature capacitors are needed.

SUMMARY OF THE INVENTION

Disclosed is the use of Surface Active Ionic Liquids (SAILs) as electrolytes for the development of novel supercapacitors with extremely high energy densities. SAILs gave rise to unprecedented high intrinsic areal capacitances (~100-200 µF/cm$^2$), much larger than the values (~5 to 20 uF/cm$^2$) of other known ILs based on smaller anions as well as commonly used aqueous/organic electrolytes. Combined with the extremely wide potential working windows of ILs (~4 to 5 V), SAIL-based devices are expected to exhibit ultrahigh energy densities. Another unique advantage of SAIL-based energy storage is the suitability for operation at extremely high temperature (about 200° C.), which may find applications such as powering sensors in the oil industry (downhole temperatures can be above 120° C.), electronics in hybrid electric vehicles (operating temperatures above 60° C.), or military weapons and space equipment. The SAILs are generated by associating low environmental impact cations (proven to be less toxic and more biodegradable) with organic surfactant anions providing more sustainable, high capacitance, thermally stable, electrolytes.

DETAILED DESCRIPTION OF THE INVENTION

Figure 1:
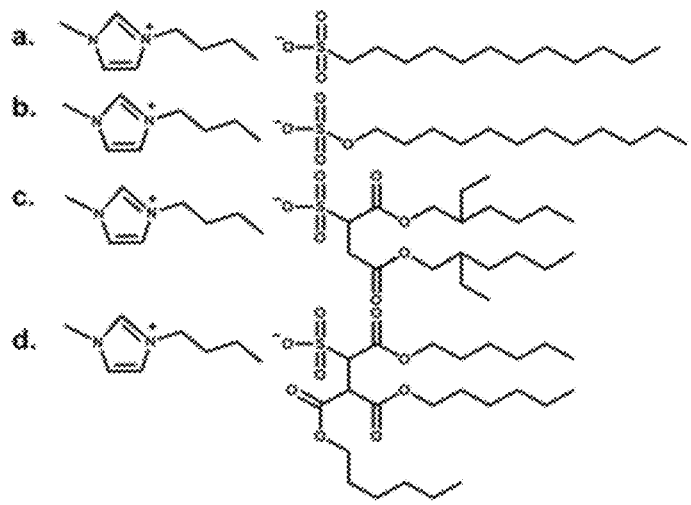
FIG. 1 depicts structural formulae for various SAILs of the present invention.

In a first aspect, the present invention provides a capacitor comprising a first ionic liquid, wherein the first ionic liquid comprises an anion that is a surface-active agent.

In some embodiments of the first aspect, the first ionic liquid is not [bmim][AOT]. In some embodiments, the capacitor further comprises a second ionic liquid.

In some embodiments of the first aspect, the first ionic liquid comprises an anion selected from the group consisting of AOT, C$_3$-C$_{24}$ alkylsulfate anions, C$_3$-C$_{24}$ alkylsulfonate anions, C$_3$-C$_{24}$ alkylcarboxylate anions, C$_3$-C$_{24}$ alkylphosphate anions, or C$_3$-C$_{24}$ alkylphosphonate anions. In some embodiments, the first ionic liquid comprises a C$_3$-C$_{24}$ alkylsulfate anion or a C$_3$-C$_{24}$ alkylsulfonate anion. In preferred embodiments, the first ionic liquid comprises octylsulfate, decylsulfate, dodecylsulfate, or dodecylsulfonate.

In some embodiments of the first aspect, the first ionic liquid further comprises a cation selected from the group consisting of bmim cation, pyridinium cations, pyrrolidinium cations, pyrazolium cations, phosphonium cations, ammonium cations, and sulfonium cations. In preferred embodiments, the first ionic liquid comprises bmim.

In preferred embodiments of the first aspect, the first ionic liquid is [bmim][octylsulfate], [bmim][decylsulfate], or [bmim][dodecylsulfate].

In some embodiments of the first aspect, the first ionic liquid further comprises a cation selected from the group consisting of polyimidazolium cations, poly(alkylammonium) cations, and poly(allyldimethylmmonium) cations.

In some embodiments of the first aspect, the capacitor further comprises a second ionic liquid. In some embodiments, the second ionic liquid comprises AOT or a tetrafluoroborate anion. In some embodiments, the second ionic liquid comprises a sodium cation or a bmim cation. In preferred embodiments, the second ionic liquid is [bmim] [AOT].

In some embodiments of the first aspect, the first ionic liquid is a liquid in the range from about −30° C. to about 250° C. In some embodiments, the first ionic liquid is a liquid in the range from about −30° C. to about 90° C. In some embodiments, the first ionic liquid is a liquid in the range from about 90° C. to about 250° C. In some embodiments, the first ionic liquid is a liquid in the range from about 120° C. to about 250° C. In some embodiments, the first ionic liquid is a liquid in the range from about 150° C. to about 250° C.

In some embodiments of the first aspect, the first ionic liquid has a capacitance of greater than about 10 μF/cm². In some embodiments, the first ionic liquid has a capacitance of greater than about 20 μF/cm². In some embodiments, the first ionic liquid has a capacitance of greater than about 50 μF/cm².

In some embodiments of the first aspect, the first ionic liquid has a capacitance at a scan rate of about 0.01 V/s of greater than about 10 μF/cm².

In some embodiments of the first aspect, the first ionic liquid exhibits long-range molecular ordering. In some embodiments, the first ionic liquid exhibits a Bragg peak.

In a second aspect, the present invention provides a method of using a capacitor of the first aspect comprising applying a potential to the capacitor. In some embodiments, the capacitor is at a temperature in the range from about −30° C. to about 250° C. In some embodiments, the capacitor is at a temperature in the range from about −30° C. to about 90° C. In some embodiments, the capacitor is at a temperature in the range from about 90° C. to about 250° C. In some embodiments, the capacitor is at a temperature in the range from about 120° C. to about 250° C. In some embodiments, the capacitor is at a temperature in the range from about 150° C. to about 250° C. In some embodiments, the capacitor is at a temperature of about 200° C.

In a third aspect, the present invention provides a capacitor comprising a first ionic liquid, wherein the first ionic liquid comprises a cation that is a surface-active agent.

In some embodiments of the third aspect, the first ionic liquid is not [bmim][AOT]. In some embodiments, the capacitor further comprises a second ionic liquid.

In some embodiments of the third aspect, the first ionic liquid comprises a cation selected from the group consisting of bmim cation, pyridinium cations, pyrrolidinium cations, pyrazolium cations, phosphonium cations, ammonium cations, and sulfonium cations. In preferred embodiments, the first ionic liquid comprises bmim.

In some embodiments of the third aspect, the first ionic liquid comprises a cation selected from the group consisting of polyimidazolium cations, poly(alkylammonium) cations, and poly(allyldimethylmmonium) cations.

In some embodiments of the third aspect, the first ionic liquid comprises an anion selected from the group consisting of AOT, boron tetrafluoride, phosphorus tetrafluoride, phosphorus hexafluoride, alkylsulfonate, fluoroalkylsulfonate, arylsulfonate, bis(alkylsulfonyl)amide, bis(fluoroalkylsulfonyl)amide, bis(arylsulfonyl)amide, (fluoroalkylsulfonyl) (fluoroalkylcarbonyl)amide, halide, nitrate, nitrite, sulfate, hydrogensulfate, alkyl sulfate, aryl sulfate, carbonate, bicarbonate, carboxylate, phosphate, hydrogen phosphate, dihydrogen phosphate, hypochlorite, and an anionic site of a cation-exchange resin. In some embodiments, the first ionic liquid comprises an anion selected from the group consisting of boron tetrafluoride, phosphorus hexafluoride, methanesulfonate, trifluoromethanesulfonate, benzenesulfonate, p-toluenesulfonate, bis(methanesulfonyl)amide, bis(trifluoromethanesulfonyl)amide, bis(benzenesulfonyl)amide, and bis(p-toluenesulfonyl)amide. In some embodiments, the first ionic liquid comprises an anion selected from the group consisting of methanesulfonate, trifluoromethanesulfonate, benzenesulfonate, p-toluenesulfonate, bis(methanesulfonyl) amide, bis(trifluoromethanesulfonyl)amide, bis(benzenesulfonyl)amide, and bis(p-toluenesulfonyl)amide. In some embodiments, the first ionic liquid comprises an anion selected from the group consisting of bis(methanesulfonyl) amide, bis(trifluoromethanesulfonyl)amide, bis(benzenesulfonyl)amide, and bis(p-toluenesulfonyl)amide. In some embodiments, the first ionic liquid comprises an anion selected from the group consisting of bis(trifluoromethanesulfonyl)amide and (trifluoromethanesulfonyl)(trifluoroacetyl)amide. In preferred embodiments, the first ionic liquid comprises bis(trifluoroethanesulfonyl)amide.

In some embodiments of the third aspect, the capacitor further comprises a second ionic liquid.

In some embodiments of the third aspect, the second ionic liquid comprises an anion selected from the group consisting of AOT, $C_3$-$C_{24}$ alkylsulfate anions, $C_3$-$C_{24}$ alkylsulfonate anions, $C_3$-$C_{24}$ alkylcarboxylate anions, $C_3$-$C_{24}$ alkylphosphate anions, or $C_3$-$C_{24}$ alkylphosphonate anions. In some embodiments, the second ionic liquid comprises a $C_3$-$C_{24}$ alkylsulfate anion or a $C_3$-$C_{24}$ alkylsulfonate anion. In some preferred embodiments, the second ionic liquid comprises octylsulfate, decylsulfate, dodecylsulfate, or dodecylsulfonate. In other preferred embodiments, the second ionic liquid comprises AOT or a tetrafluoroborate anion. In other preferred embodiments, the second ionic liquid comprises a sodium cation or a bmim cation.

In preferred embodiments of the third aspect, the second ionic liquid is [bmim][AOT].

In some embodiments of the third aspect, the first ionic liquid is a liquid in the range from about −30° C. to about 250° C. In some embodiments, the first ionic liquid is a liquid in the range from about −30° C. to about 90° C. In some embodiments, the first ionic liquid is a liquid in the range from about 90° C. to about 250° C. In some embodiments, the first ionic liquid is a liquid in the range from about 120° C. to about 250° C. In some embodiments, the first ionic liquid is a liquid in the range from about 150° C. to about 250° C.

In some embodiments of the third aspect, the first ionic liquid has a capacitance of greater than about 10 μF/cm². In some embodiments, the first ionic liquid has a capacitance of greater than about 20 μF/cm². In some embodiments, the first ionic liquid has a capacitance of greater than about 50 μF/cm².

In some embodiments of the third aspect, the first ionic liquid has a capacitance at a scan rate of about 0.01 V/s of greater than about 10 μF/cm².

In some embodiments of the third aspect, the first ionic liquid exhibits long-range molecular ordering. In some embodiments, the first ionic liquid exhibits a Bragg peak.

In a fourth aspect, the present invention provides a method of using a capacitor of the third aspect comprising applying a potential to the capacitor. In some embodiments, the capacitor is at a temperature in the range from about −30° C. to about 250° C. In some embodiments, the capacitor is at a temperature in the range from about −30° C. to about 90° C. In some embodiments, the capacitor is at a temperature in the range from about 90° C. to about 250° C. In some embodiments, the capacitor is at a temperature in the range from about 120° C. to about 250° C. In some embodiments, the capacitor is at a temperature in the range from about 150° C. to about 250° C. In some embodiments, the capacitor is at a temperature of about 200° C.

Definitions

Unless otherwise defined herein, scientific and technical terms used in this application shall have the meanings that are commonly understood by those of ordinary skill in the art. Generally, nomenclature used in connection with, and techniques of, chemistry described herein, are those well-known and commonly used in the art.

The term "acyl" is art-recognized and refers to a group represented by the general formula hydrocarbylC(O)—, preferably alkylC(O)—.

The term "acylamino" is art-recognized and refers to an amino group substituted with an acyl group and may be represented, for example, by the formula hydrocarbylC(O) NH—.

The term "acyloxy" is art-recognized and refers to a group represented by the general formula hydrocarbylC(O)O—, preferably alkylC(O)O—.

The term "alkoxy" refers to an alkyl group, having an oxygen attached thereto. Representative alkoxy groups include methoxy, trifluoromethoxy, ethoxy, propoxy, tert-butoxy and the like.

The term "alkoxyalkyl" refers to an alkyl group substituted with an alkoxy group and may be represented by the general formula alkyl-O-alkyl.

The term "alkenyl", as used herein, refers to an aliphatic group containing at least one double bond and is intended to include both "unsubstituted alkenyls" and "substituted alkenyls", the latter of which refers to alkenyl moieties having substituents replacing a hydrogen on one or more carbons of the alkenyl group. Typically, a straight chained or branched alkenyl group has from 1 to about 20 carbon atoms, preferably from 1 to about 10 unless otherwise defined. Such substituents may occur on one or more carbons that are included or not included in one or more double bonds. Moreover, such substituents include all those contemplated for alkyl groups, as discussed below, except where stability is prohibitive. For example, substitution of alkenyl groups by one or more alkyl, carbocyclyl, aryl, heterocyclyl, or heteroaryl groups is contemplated.

An "alkyl" group or "alkane" is a straight chained or branched non-aromatic hydrocarbon which is completely saturated. Typically, a straight chained or branched alkyl group has from 1 to about 20 carbon atoms, preferably from 1 to about 10 unless otherwise defined. Examples of straight chained and branched alkyl groups include methyl, ethyl, n-propyl, iso-propyl, n-butyl, sec-butyl, tert-butyl, pentyl, hexyl, pentyl and octyl.

Moreover, the term "alkyl" as used throughout the specification, examples, and claims is intended to include both "unsubstituted alkyls" and "substituted alkyls", the latter of which refers to alkyl moieties having substituents replacing a hydrogen on one or more substitutable carbons of the hydrocarbon backbone. Such substituents, if not otherwise specified, can include, for example, a halogen (e.g., fluoro), a hydroxyl, a carbonyl (such as a carboxyl, an alkoxycarbonyl, a formyl, or an acyl), a thiocarbonyl (such as a thioester, a thioacetate, or a thioformate), an alkoxy, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. In preferred embodiments, the substituents on substituted alkyls are selected from $C_{1-6}$ alkyl, $C_{3-6}$ cycloalkyl, halogen, carbonyl, cyano, or hydroxyl. In more preferred embodiments, the substituents on substituted alkyls are selected from fluoro, carbonyl, cyano, or hydroxyl. It will be understood by those skilled in the art that the moieties substituted on the hydrocarbon chain can themselves be substituted, if appropriate. For instance, the substituents of a substituted alkyl may include substituted and unsubstituted forms of amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), —$CF_3$, —CN and the like. Exemplary substituted alkyls are described below. Cycloalkyls can be further substituted with alkyls, alkenyls, alkoxys, alkylthios, aminoalkyls, carbonyl-substituted alkyls, —$CF_3$, —CN, and the like.

The term "$C_{x-y}$" when used in conjunction with a chemical moiety, such as, acyl, acyloxy, alkyl, alkenyl, alkynyl, or alkoxy is meant to include groups that contain from x to y carbons in the chain. For example, the term "$C_{x-y}$ alkyl" refers to substituted or unsubstituted saturated hydrocarbon groups, including straight-chain alkyl and branched-chain alkyl groups that contain from x to y carbons in the chain, including haloalkyl groups. Preferred haloalkyl groups include trifluoromethyl, difluoromethyl, 2,2,2-trifluoroethyl, and pentafluoroethyl. $C_0$ alkyl indicates a hydrogen where the group is in a terminal position, a bond if internal. The terms "$C_{2-y}$ alkenyl" and "$C_{2-y}$ alkynyl" refer to substituted or unsubstituted unsaturated aliphatic groups analogous in length and possible substitution to the alkyls described above, but that contain at least one double or triple bond respectively.

The term "alkylamino", as used herein, refers to an amino group substituted with at least one alkyl group.

The term "alkylthio", as used herein, refers to a thiol group substituted with an alkyl group and may be represented by the general formula alkylS—.

The term "arylthio", as used herein, refers to a thiol group substituted with an alkyl group and may be represented by the general formula arylS—.

The term "alkynyl", as used herein, refers to an aliphatic group containing at least one triple bond and is intended to include both "unsubstituted alkynyls" and "substituted alkynyls", the latter of which refers to alkynyl moieties having substituents replacing a hydrogen on one or more carbons of the alkynyl group. Typically, a straight chained or branched alkynyl group has from 1 to about 20 carbon atoms, preferably from 1 to about 10 unless otherwise defined. Such substituents may occur on one or more carbons that are included or not included in one or more triple bonds. Moreover, such substituents include all those contemplated for alkyl groups, as discussed above, except where stability is prohibitive. For example, substitution of alkynyl groups by one or more alkyl, carbocyclyl, aryl, heterocyclyl, or heteroaryl groups is contemplated.

The term "amide", as used herein, refers to a group

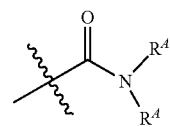

wherein each $R^A$ independently represent a hydrogen or hydrocarbyl group, or two $R^A$ are taken together with the N atom to which they are attached complete a heterocycle having from 4 to 8 atoms in the ring structure.

The terms "amine" and "amino" are art-recognized and refer to both unsubstituted and substituted amines and salts thereof, e.g., a moiety that can be represented by

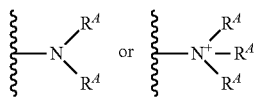

wherein each $R^A$ independently represents a hydrogen or a hydrocarbyl group, or two $R^A$ are taken together with the N atom to which they are attached complete a heterocycle having from 4 to 8 atoms in the ring structure.

The term "aminoalkyl", as used herein, refers to an alkyl group substituted with an amino group.

The term "AOT" refers to 1,4-bis(2-ethylhexoxy)-1,4-dioxobutane-2-sulfonate.

The term "aralkyl", as used herein, refers to an alkyl group substituted with an aryl group.

The term "aryl" as used herein include substituted or unsubstituted single-ring aromatic groups in which each atom of the ring is carbon. Preferably the ring is a 6- or 20-membered ring, more preferably a 6-membered ring. The term "aryl" also includes polycyclic ring systems having two or more cyclic rings in which two or more carbons are common to two adjoining rings wherein at least one of the rings is aromatic, e.g., the other cyclic rings can be cycloalkyls, cycloalkenyls, cycloalkynyls, aryls, heteroaryls, and/or heterocyclyls. Aryl groups include benzene, naphthalene, phenanthrene, phenol, aniline, and the like.

The term "bmim" refers to 1-Butyl-3-methylimidazolium.

The term "carbamate" is art-recognized and refers to a group

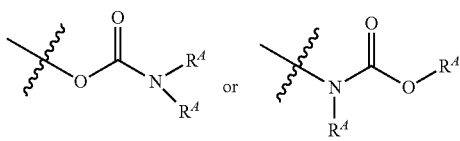

wherein each $R^A$ independently represent hydrogen or a hydrocarbyl group, such as an alkyl group, or both $R^A$ taken together with the intervening atom(s) complete a heterocycle having from 4 to 8 atoms in the ring structure.

The terms "carbocycle", and "carbocyclic", as used herein, refers to a saturated or unsaturated ring in which each atom of the ring is carbon. Preferably, a carbocylic group has from 3 to 20 carbon atoms. The term carbocycle includes both aromatic carbocycles and non-aromatic carbocycles. Non-aromatic carbocycles include both cycloalkane rings, in which all carbon atoms are saturated, and cycloalkene rings, which contain at least one double bond. "Carbocycle" includes 5-7 membered monocyclic and 8-12 membered bicyclic rings. Each ring of a bicyclic carbocycle may be selected from saturated, unsaturated and aromatic rings. Carbocycle includes bicyclic molecules in which one, two or three or more atoms are shared between the two rings. The term "fused carbocycle" refers to a bicyclic carbocycle in which each of the rings shares two adjacent atoms with the other ring. Each ring of a fused carbocycle may be selected from saturated, unsaturated and aromatic rings. In an exemplary embodiment, an aromatic ring, e.g., phenyl, may be fused to a saturated or unsaturated ring, e.g., cyclohexane, cyclopentane, or cyclohexene. Any combination of saturated, unsaturated and aromatic bicyclic rings, as valence permits, is included in the definition of carbocyclic. Exemplary "carbocycles" include cyclopentane, cyclohexane, bicyclo[2.2.1]heptane, 1,5-cyclooctadiene, 1,2,3,4-tetrahydronaphthalene, bicyclo[4.2.0]oct-3-ene, naphthalene and adamantane. Exemplary fused carbocycles include decalin, naphthalene, 1,2,3,4-tetrahydronaphthalene, bicyclo[4.2.0] octane, 4,5,6,7-tetrahydro-1H-indene and bicyclo[4.1.0] hept-3-ene. "Carbocycles" may be substituted at any one or more positions capable of bearing a hydrogen atom.

A "cycloalkyl" group is a cyclic hydrocarbon which is completely saturated. "Cycloalkyl" includes monocyclic and bicyclic rings. Preferably, a cycloalkyl group has from 3 to 20 carbon atoms. Typically, a monocyclic cycloalkyl group has from 3 to about 10 carbon atoms, more typically 3 to 8 carbon atoms unless otherwise defined. The second ring of a bicyclic cycloalkyl may be selected from saturated, unsaturated and aromatic rings. Cycloalkyl includes bicyclic molecules in which one, two or three or more atoms are shared between the two rings. The term "fused cycloalkyl" refers to a bicyclic cycloalkyl in which each of the rings shares two adjacent atoms with the other ring. The second ring of a fused bicyclic cycloalkyl may be selected from saturated, unsaturated and aromatic rings. A "cycloalkenyl" group is a cyclic hydrocarbon containing one or more double bonds.

The term "carbocyclylalkyl", as used herein, refers to an alkyl group substituted with a carbocycle group.

The term "carbonate", as used herein, refers to a group —OCO$_2$—$R^A$, wherein $R^A$ represents a hydrocarbyl group.

The term "carboxy", as used herein, refers to a group represented by the formula —CO$_2$H.

The term "ester", as used herein, refers to a group —C(O)OR$^A$ wherein $R^A$ represents a hydrocarbyl group.

The term "ether", as used herein, refers to a hydrocarbyl group linked through an oxygen to another hydrocarbyl group. Accordingly, an ether substituent of a hydrocarbyl group may be hydrocarbyl-O—. Ethers may be either symmetrical or unsymmetrical. Examples of ethers include, but are not limited to, heterocycle-O-heterocycle and aryl-O-heterocycle. Ethers include "alkoxyalkyl" groups, which may be represented by the general formula alkyl-O-alkyl.

The terms "halo" and "halogen" as used herein means halogen and includes chloro, fluoro, bromo, and iodo.

The terms "hetaralkyl" and "heteroaralkyl", as used herein, refers to an alkyl group substituted with a hetaryl group.

The term "heteroalkyl", as used herein, refers to a saturated or unsaturated chain of carbon atoms and at least one heteroatom, wherein no two heteroatoms are adjacent.

The terms "heteroaryl" and "hetaryl" include substituted or unsubstituted aromatic single ring structures, preferably 5- to 20-membered rings, more preferably 5- to 6-membered rings, whose ring structures include at least one heteroatom, preferably one to four heteroatoms, more preferably one or two heteroatoms. The terms "heteroaryl" and "hetaryl" also include polycyclic ring systems having two or more cyclic rings in which two or more carbons are common to two adjoining rings wherein at least one of the rings is heteroaromatic, e.g., the other cyclic rings can be cycloalkyls, cycloalkenyls, cycloalkynyls, aryls, heteroaryls, and/or heterocyclyls. Heteroaryl groups include, for example, pyrrole, furan, thiophene, imidazole, oxazole, thiazole, pyrazole, pyridine, pyrazine, pyridazine, and pyrimidine, and the like.

The term "heteroatom" as used herein means an atom of any element other than carbon or hydrogen. Preferred heteroatoms are nitrogen, oxygen, and sulfur.

The terms "heterocyclyl", "heterocycle", and "heterocyclic" refer to substituted or unsubstituted non-aromatic ring structures, preferably 3- to 20-membered rings, more preferably 3- to 7-membered rings, whose ring structures include at least one heteroatom, preferably one to four heteroatoms, more preferably one or two heteroatoms. The terms "heterocyclyl" and "heterocyclic" also include polycyclic ring systems having two or more cyclic rings in which two or more carbons are common to two adjoining rings wherein at least one of the rings is heterocyclic, e.g., the other cyclic rings can be cycloalkyls, cycloalkenyls, cycloalkynyls, aryls, heteroaryls, and/or heterocyclyls. Heterocyclyl groups include, for example, piperidine, piperazine, pyrrolidine, morpholine, lactones, lactams, and the like.

The term "heterocyclylalkyl", as used herein, refers to an alkyl group substituted with a heterocycle group.

The term "hydrocarbyl", as used herein, refers to a group that is bonded through a carbon atom, wherein that carbon atom does not have a =O or =S substituent. Hydrocarbyls may optionally include heteroatoms. Hydrocarbyl groups include, but are not limited to, alkyl, alkenyl, alkynyl, alkoxyalkyl, aminoalkyl, aralkyl, aryl, aralkyl, carbocyclyl, cycloalkyl, carbocyclylalkyl, heteroaralkyl, heteroaryl groups bonded through a carbon atom, heterocyclyl groups bonded through a carbon atom, heterocyclylakyl, or hydroxyalkyl. Thus, groups like methyl, ethoxyethyl, 2-pyridyl, and trifluoromethyl are hydrocarbyl groups, but substituents such as acetyl (which has a =O substituent on the linking carbon) and ethoxy (which is linked through oxygen, not carbon) are not.

The term "hydroxyalkyl", as used herein, refers to an alkyl group substituted with a hydroxy group.

The term "lower" when used in conjunction with a chemical moiety, such as, acyl, acyloxy, alkyl, alkenyl, alkynyl, or alkoxy is meant to include groups where there are six or fewer non-hydrogen atoms in the substituent. A "lower alkyl", for example, refers to an alkyl group that contains six or fewer carbon atoms. In certain embodiments, acyl, acyloxy, alkyl, alkenyl, alkynyl, or alkoxy substituents defined herein are respectively lower acyl, lower acyloxy, lower alkyl, lower alkenyl, lower alkynyl, or lower alkoxy, whether they appear alone or in combination with other substituents, such as in the recitations hydroxyalkyl and aralkyl (in which case, for example, the atoms within the aryl group are not counted when counting the carbon atoms in the alkyl substituent).

The terms "polycyclyl", "polycycle", and "polycyclic" refer to two or more rings (e.g., cycloalkyls, cycloalkenyls, cycloalkynyls, aryls, heteroaryls, and/or heterocyclyls) in which two or more atoms are common to two adjoining rings, e.g., the rings are "fused rings". Each of the rings of the polycycle can be substituted or unsubstituted. In certain embodiments, each ring of the polycycle contains from 3 to 10 atoms in the ring, preferably from 5 to 7.

In the phrase "poly(meta-phenylene oxides)", the term "phenylene" refers inclusively to 6-membered aryl or 6-membered heteroaryl moieties. Exemplary poly(metaphenylene oxides) are described in the first through twentieth aspects of the present disclosure.

The term "silyl" refers to a silicon moiety with three hydrocarbyl moieties attached thereto.

The term "substituted" refers to moieties having substituents replacing a hydrogen on one or more carbons of the backbone. It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, etc. Moieties that may be substituted can include any appropriate substituents described herein, for example, acyl, acylamino, acyloxy, alkoxy, alkoxyalkyl, alkenyl, alkyl, alkylamino, alkylthio, arylthio, alkynyl, amide, amino, aminoalkyl, aralkyl, carbamate, carbocyclyl, cycloalkyl, carbocyclylalkyl, carbonate, ester, ether, heteroaralkyl, heterocyclyl, heterocyclylalkyl, hydrocarbyl, silyl, sulfone, or thioether. As used herein, the term "substituted" is contemplated to include all permissible substituents of organic compounds. In a broad aspect, the permissible substituents include acyclic and cyclic, branched and unbranched, carbocyclic and heterocyclic, aromatic and non-aromatic substituents of organic compounds. The permissible substituents can be one or more and the same or different for appropriate organic compounds. For purposes of this invention, the heteroatoms such as nitrogen may have hydrogen substituents and/or any permissible substituents of organic compounds described herein which satisfy the valences of the heteroatoms. Substituents can include any substituents described herein, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxy, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. In preferred embodiments, the substituents on substituted alkyls are selected from $C_{1-6}$ alkyl, $C_{3-6}$ cycloalkyl, halogen, carbonyl, cyano, or hydroxyl. In more preferred embodiments, the substituents on substituted alkyls are selected from fluoro, carbonyl, cyano, or hydroxyl. It will be understood by those skilled in the art that substituents can themselves be substituted, if appropriate. Unless specifically stated as "unsubstituted," references to chemical moieties herein are understood to include substituted variants. For example, reference to an "aryl" group or moiety implicitly includes both substituted and unsubstituted variants.

The term "sulfonate" is art-recognized and refers to the group $SO_3H$, or a pharmaceutically acceptable salt thereof.

The term "sulfone" is art-recognized and refers to the group $-S(O)_2-R^A$, wherein $R^A$ represents a hydrocarbyl.

The term "thioether", as used herein, is equivalent to an ether, wherein the oxygen is replaced with a sulfur.

EXAMPLES

The invention now being generally described, it will be more readily understood by reference to the following examples which are included merely for purposes of illustration of certain aspects and embodiments of the present invention, and are not intended to limit the invention.

Example 1: Synthesis of [bmim][AOT]

Figure 2:
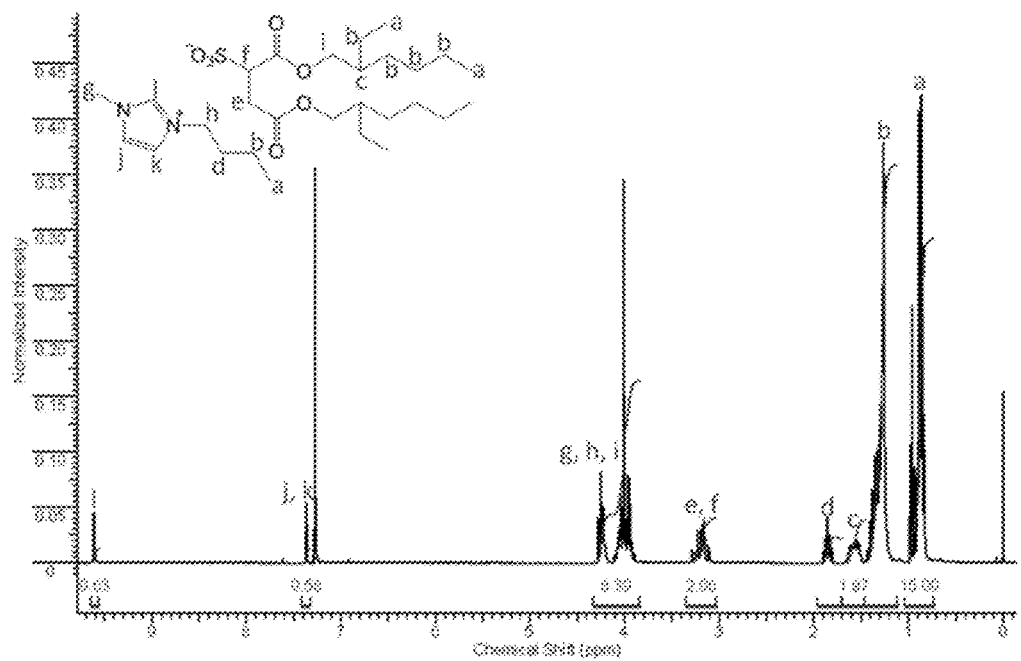
FIG. 2 shows the $^1$H NMR spectrum for [bmim][AOT].

1-butyl-3-methylimidazolium 1,4-bis(2-ethylhexoxy)-1,4-dioxobutane-2-sulfonate, [bmim][AOT] (FIG. 1C) was chosen for detailed study. The IL is prepared from cheap commercially available starting materials and is prepared simply via metathesis of Na-AOT with [bmim][Cl]. In brief, 1.0 mol equiv. of 1-butyl-3-methyl-imidazolium chloride and Na-AOT (purified via Soxhlet extraction) was placed in a round-bottom flask and stirred in dry dichloromethane for 6 h; the resulting NaCl precipitate was then filtered off and solvent removed under reduced pressure. The ILs were then dissolved in dry ethyl acetate and centrifuged at 6000 rpm for 1 h. The pure solution was separated from excess salt. It is also possible to prepare the compound using ion exchange columns. The compound was analyzed using $^1$H NMR (400 MHz): (δ=0.84-0.98) (a, 15H), (δ=1.27-1.45) (b, 18H), (δ=1.51-1.64) (c, 2H), (δ=1.82-1.90) (d, 2H), (δ=3.11-4.27) (e,f,g,h,i, 12H), (δ=7.23-7.24) (j, 1H), (δ=7.31-7.32) (k, 1H), (δ=9.65) (l, 1H) (FIG. 2).

Elemental Analysis was also carried out: (calculated in brackets) C=59.39 (60.01), H=9.14 (9.29), N=5.49 (5.00), S=5.98 (5.72), Na=0.00 (0.00). And residual water content was measured via Karl Fischer Analysis to be under 500 ppm after drying in vacuo for 4 days at 70° C. However, further measurements were carried out in atmosphere. It is important to note that the experiments described herein were carried out under atmospheric conditions which increased the water content to around 1200 ppm after 1 week. This increased no further with time.

Example 2: Physicochemical Properties of [bmim][AOT]

Figure 3:
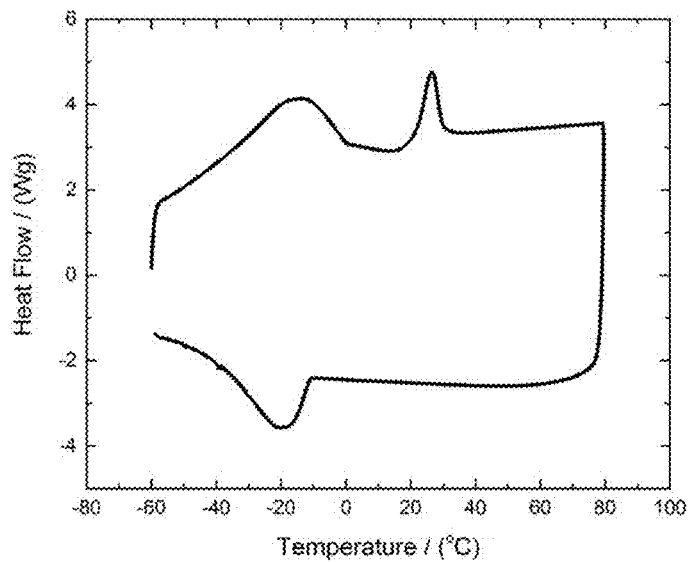
FIG. 3 shows a cyclic DSC profile of [bmim][AOT] at a scan rate of 10° C. min$^{-1}$.

Before electrochemical analysis could be carried out it was important to establish the physicochemical properties of the new ionic liquids. Firstly cyclic dynamic scanning calorimetry (DSC) profiles were recorded to estimate the melting point of the ionic liquids. The DSC profile of [bmim][AOT] is depicted in FIG. 3. The conventional definition of an ionic liquid is that they have a melting point below 100° C. This is fairly arbitrary and lower melting points around or even below room temperature may be required for application. Cycles were run with ramp rates of 10° C. min$^{-1}$. The melting point is around −19° C. with a liquid crystalline phase up to around 25° C. This is due to the C$_2$ proton on the imidazole ring.

Figure 4:
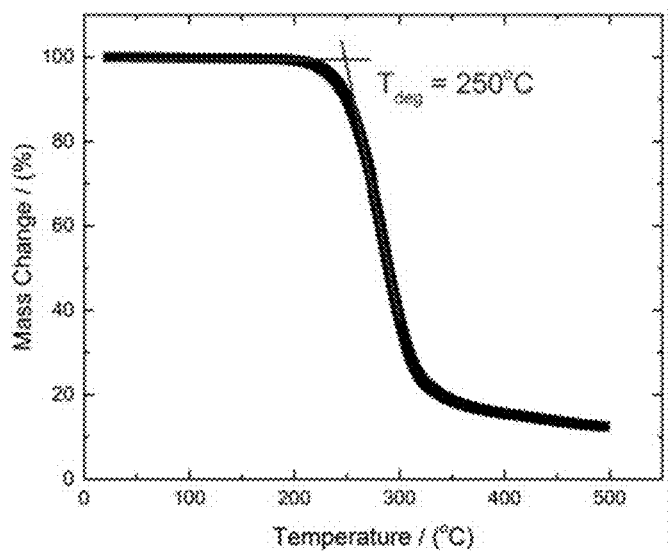
FIG. 4 shows a thermogravimetric Analysis of [bmim][AOT].

The degradation temperature of [bmim][AOT] was estimated using thermogravimetric analysis with a scan rate of 10° C. min$^{-1}$. Degradation occurred at around 250° C. (FIG. 4).

Figure 5:
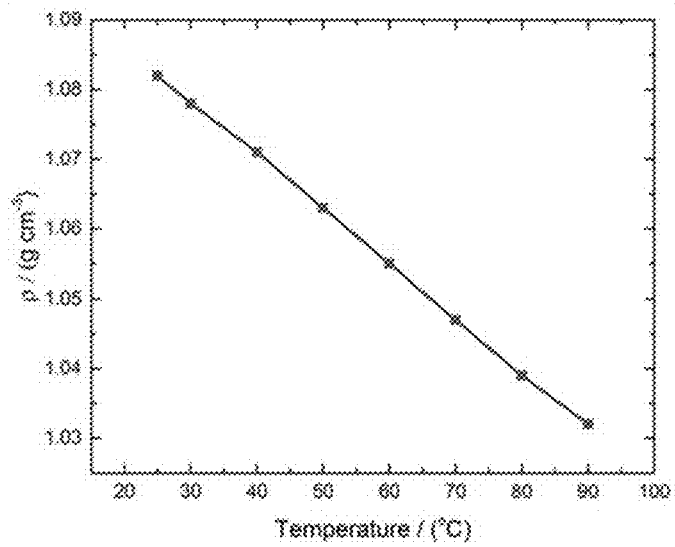
FIG. 5 shows the variation of density (ρ) with temperature for [bmim][AOT].

Density measurements were conducted from 25-90° C. (FIG. 5) and thermal expansion coefficients may be seen in Table 2. The density of [bmim][AOT] is around 1.08 g cm$^{-3}$, which is lower than most other ionic liquids conventionally used. For example, the density of [bmim][PF$_6$] is 1.36 g/cm$^3$, and the density of [bmim][BF$_4$] is 1.20 g cm$^{-3}$ [8].

TABLE 2

| Experimental values of density, ρ, as a function of temperature. | |
|---|---|
| T/(° C.) | bmim AOT<br>$α_p$ = 7.40 × 10$^{-4}$° C.$^{-1}$<br>ρ/(±0.001 g cm$^{-3}$) |
| 25.0 | 1.082 |
| 30.0 | 1.078 |
| 40.0 | 1.071 |
| 50.0 | 1.063 |
| 60.0 | 1.055 |

TABLE 2-continued

| Experimental values of density, ρ, as a function of temperature. | |
|---|---|
| T/(° C.) | bmim AOT<br>$α_p$ = 7.40 × 10$^{-4}$° C.$^{-1}$<br>ρ/(±0.001 g cm$^{-3}$) |
| 70.0 | 1.047 |
| 80.0 | 1.039 |
| 90.0 | 1.032 |

Figure 6:
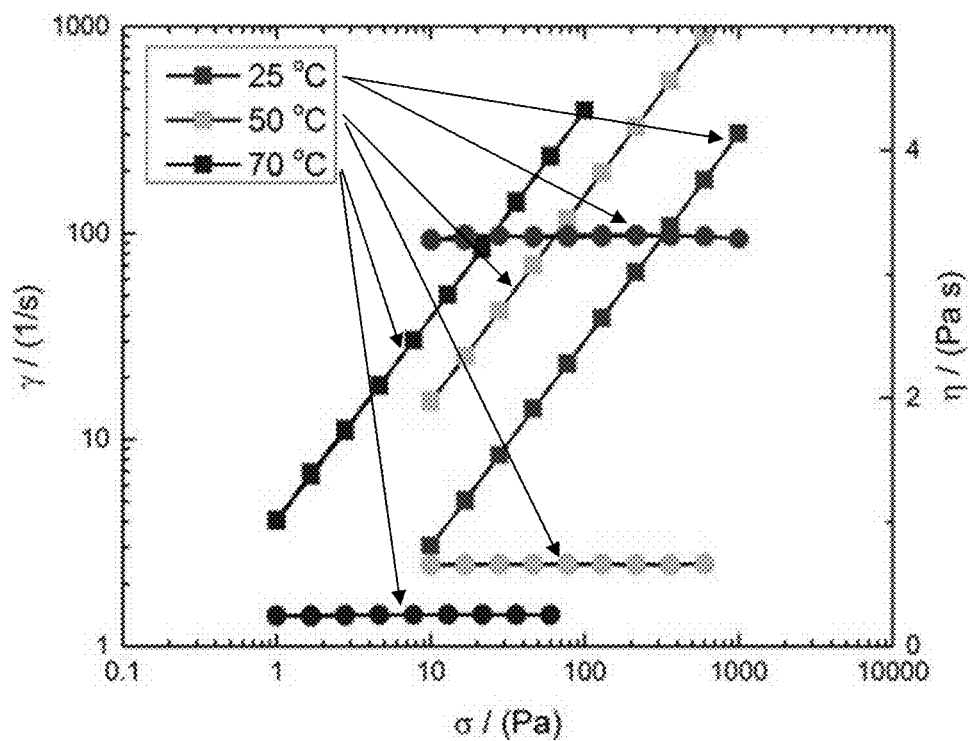
FIG. 6 shows shear rate (γ̇) vs shear stress (σ) and viscosity (η) vs shear stress (σ) for [bmim][AOT] at different temperatures (solid lines are a guide for the eye only).
Figure 7:
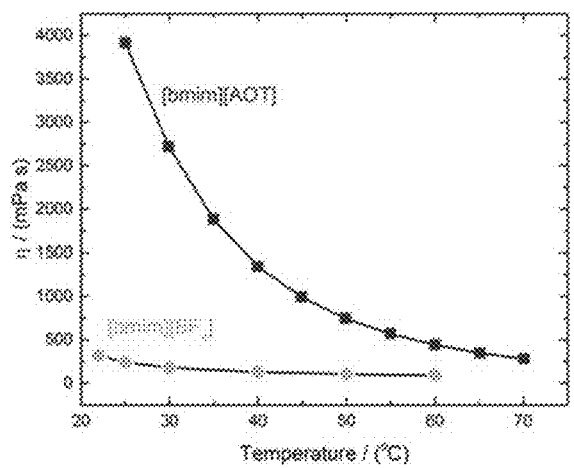
FIG. 7 shows the viscosity of [bmim][AOT] and [bmim][PF$_6$] as a function of temperature.

The viscosity of [bmim][AOT] was calculated using a cone and plate configuration and measured as a function of temperature. Each measurement was repeated three times with no shear history observed. As expected for ionic liquids [bmim][AOT] exhibited Newtonian behavior at the shear rates studied (FIG. 6). The viscosity, η, is much higher than that of conventional ionic liquids (FIG. 7) for example at 25° C. η~4000 mPa s (c.f. [bmim][PF$_6$], 376 mPa s [8]). However, as the temperature rises the viscosity fall precipitously.

Figure 8:
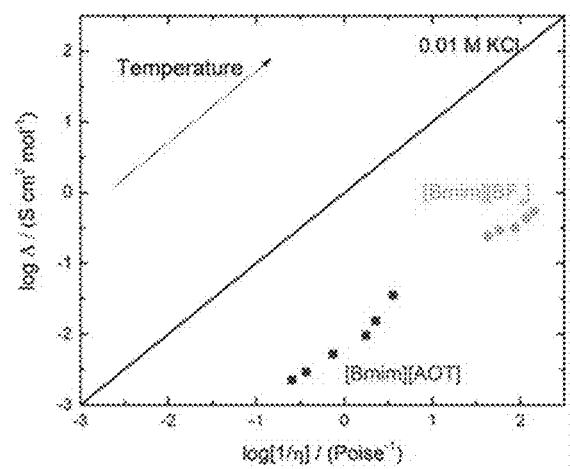
FIG. 8 shows a Walden plot of [bmim][AOT] and [bmim][BF$_4$].

Finally the "degree of ionicity" was measured. Ionic liquids are composed solely of ions. However, some exhibit much lower molar conductivity than others, after differences in viscosity are accounted for. This is because ion pairs, if sufficiently long-lived, appear neutral in the electric field and thus cannot contribute to conductivity. It is therefore vital to understand how ionic a ionic liquid is. Walden plots have demonstrated themselves useful as simple and accessible approaches to answering this question. On a plot of the log of molar conductivity plotted against log η a straight line should be observed that passes through the origin. Calibration uses 0.01M KCL solution and provides a reference line. Most ionic liquids fall below this line suggesting that complete ionization is not complete. Some ionic liquids fall much lower than this line indicating very low conductivity. [bmim][AOT] exhibits an ionicity lower than the KCl reference. However, it compares favorably to conventional ILs such as [bmim][BF$_4$] which are themselves generally considered fairly ionic (FIG. 8).

Figure 9:
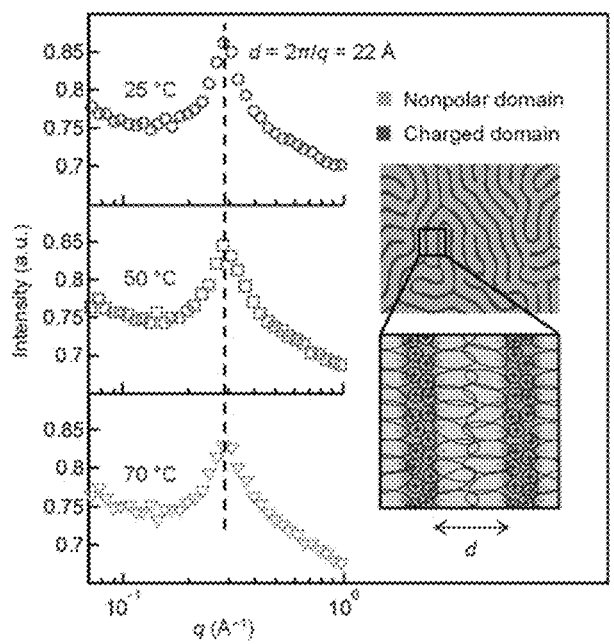
FIG. 9 shows SANS profiles of [bmim][AOT] at different temperatures. Inset: schematic illustration of the nanostructural organization in [bmim][AOT].
Figure 10:
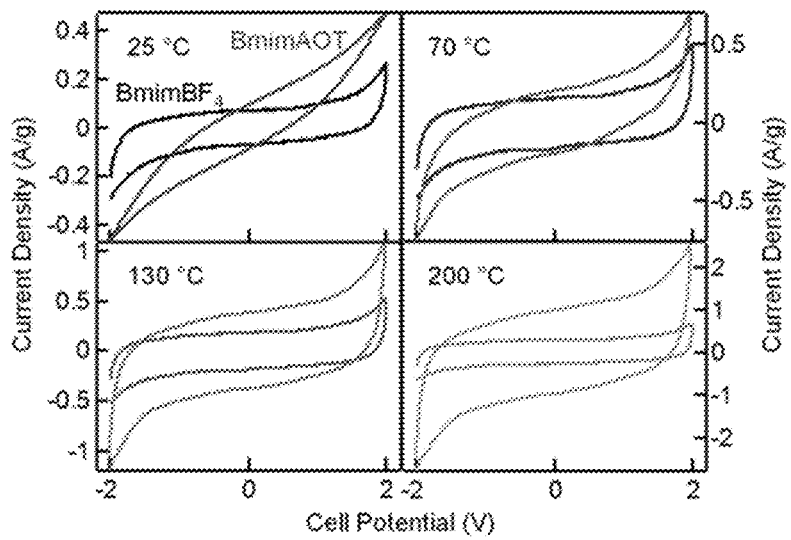
FIG. 10 shows cyclic voltammograms of [bmim][AOT] (greater current densities achieved) and [bmim][BF$_4$] (lower current densities achieved) as a function of temperature at scan rates of 0.001 Vs$^{-1}$.

The initial high capacitance observed is due to structuring of the ionic liquid. Therefore before any electrochemistry experiments were carried out the microstructure of bulk [bmim][AOT] was investigated using small-angle neutron scattering (SANS) [9]. Previous computational research has shown that ionic liquids often have some degree of microheterogeneity. Experimentally, however this has only been observed for long chained ionic liquids that self-aggregate. The SANS data agrees with this finding. A conventional IL, in this case [bmim][BF$_4$] exhibits no long range molecular ordering, whereas [bmim][AOT] clearly shows ordering (a Bragg Peak) commensurate with the length of the surfactant anion tail, ~22 Å (FIG. 9). This Bragg peak is constant up to the maximum measured temperature of 70° C. (limits of the machine).

Example 3: Electrochemical Studies of [bmim][AOT]

Figure 11:
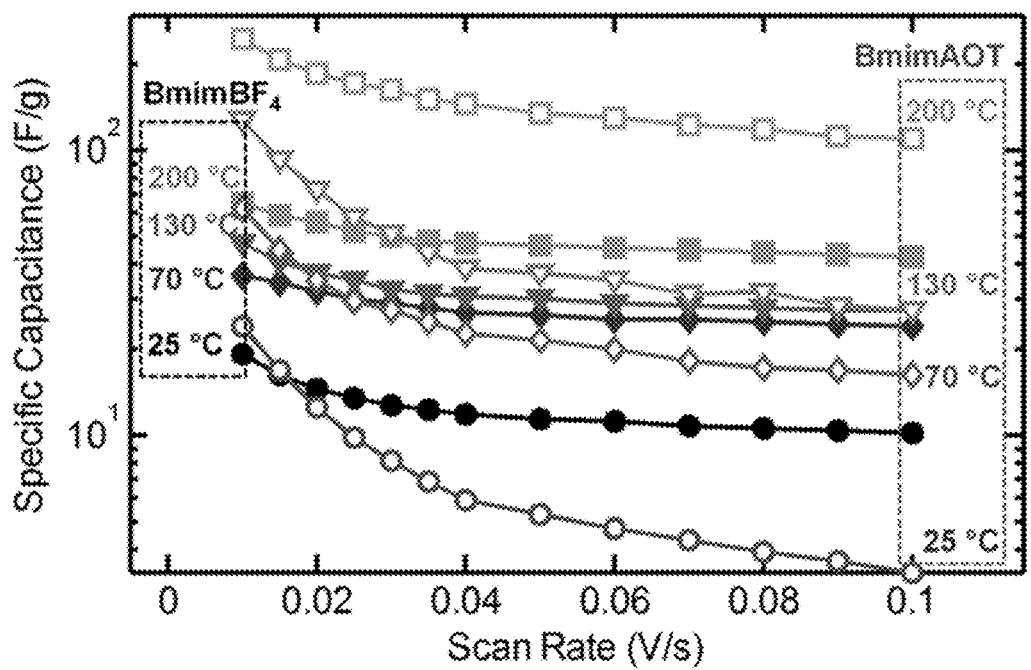
FIG. 11 shows specific capacitance as a function of scan rate and temperature for [bmim][AOT] and [bmim][BF$_4$].
Figure 12:
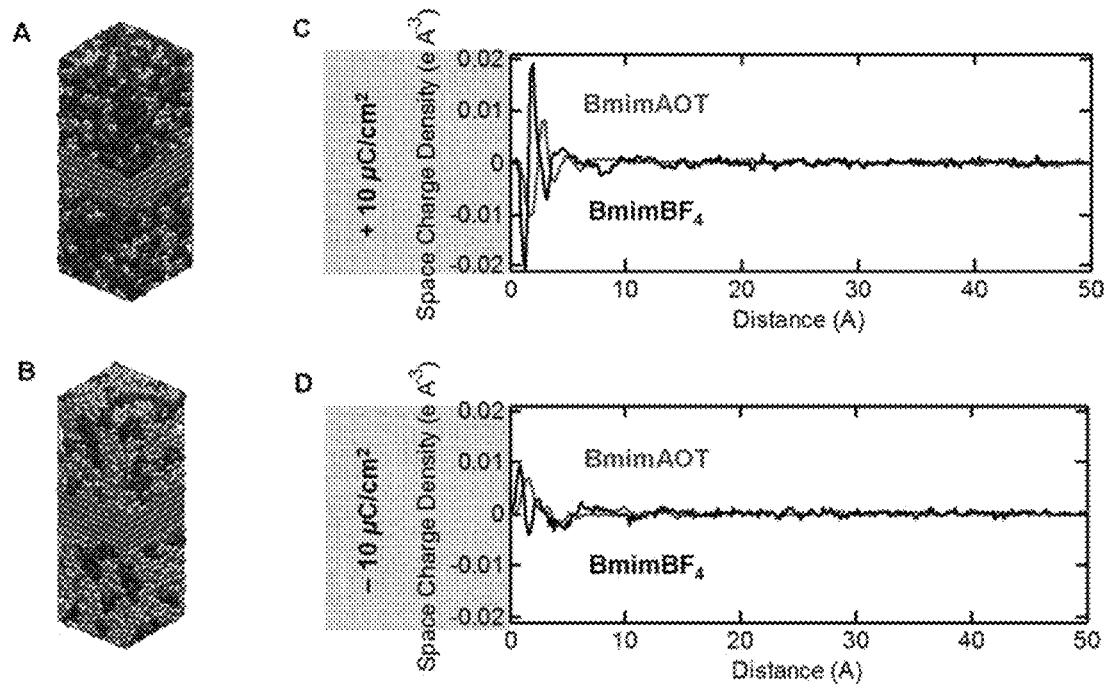
FIG. 12 shows a snapshot of MD simulation boxes for (A) [bmim][BF$_4$] and (B) [bmim][AOT]. The red, blue, and gray regions represent cationic, anionic, and nonpolar domains. Panels C and D show space charge density distribution for [bmim][AOT] and [bmim][BF$_4$] versus distance from the graphite surface when the surface charge density on the electrode is (C) 10 µC/cm$^2$ and (D)–10 µC/cm$^2$.

Once physicochemical properties had been established the capacitance of the ionic liquids was investigated as a function of scan rates. This was achieved using a home built cell. Using a well-established procedure carbon nanotubes were drop cast onto carbon fiber paper, which was attached to a glass slide using copper tape. Two slides were then sandwiched together with ionic liquid in between. Filter paper was not used as some ionic liquids have been known to dissolve cellulose and other materials so it was deemed prudent to avoid this step for now. However, due to high viscosity and good control of intersheet distance this was not a problem. FIG. 11 shows the cyclic voltammetric (CV) curves of [bmim][AOT] and [bmim][BF$_4$] at different temperatures. It can be seen that at higher temperatures (70, 130 and 200° C.), the integrated CV areas for [bmim][AOT] were significantly larger than those for [bmim][BF$_4$]. The energy storage performance (capacitance versus scan rate) is shown in FIG. 12, from which it is observed that [bmim][AOT] outperformed [bmim][BF$_4$] over the entire scan rate range at higher temperatures (70, 130 and 200° C.).

Finally, it should be noted that experiments carried out under an applied potential at 200° C. turned black. However, capacitance remained high and curves were reproducible over many cycles and many weeks. LC-MS and $^1$H NMR analysis showed no decomposition products presence at the limits of their detection. This is not uncommon in literature where minor impurities can lead to significant changes in coloration.

To illustrate the origin of this unusually high capacitance of [bmim][AOT] as compared to all previously known electrolytes, molecular dynamics (MD) simulations of [bmim][AOT] and [bmim][BF$_4$] on charged graphite electrode surfaces were performed. FIGS. 12 A and B show that in contrast to [bmim][BF$_4$], [bmim][AOT] exhibits clearly self-assembled nanoscale nonpolar domains, which provide nanoconfinements for polar, cationic and anionic entities. FIGS. 12C and D show that [bmim][BF$_4$] shows an oscillatory charge distribution because strong electrostatic interaction between cations and anions. By comparison, [bmim][AOT] displayed a dampened, more diffusive charge distribution profile, characteristic of nanostructured ionic liquids.

Figure 13:
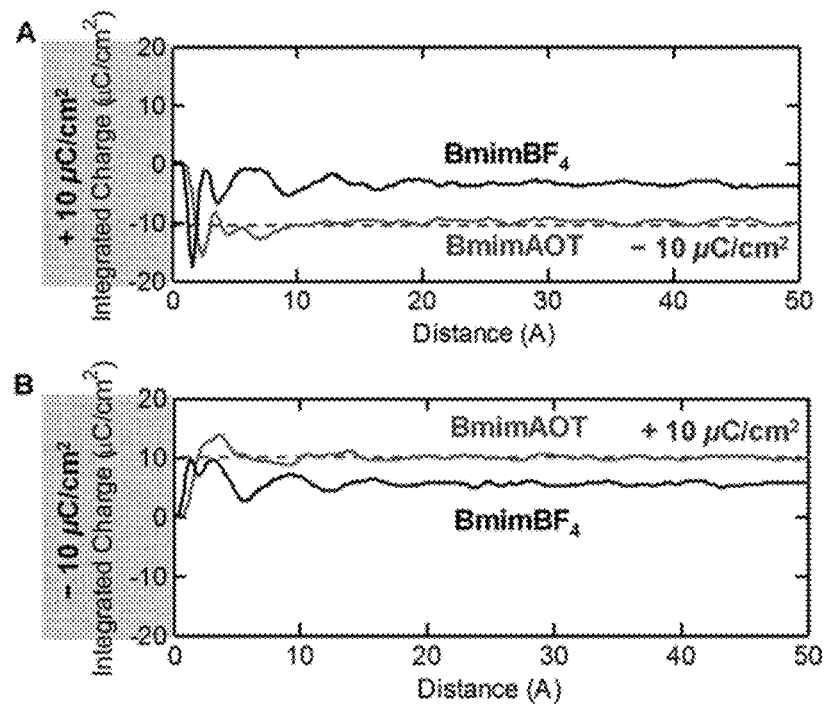
FIG. 13 shows space charge density distributions for [bmim][AOT] and [bmim][BF$_4$] versus distance from the graphite surface when the surface charge density on the electrode is (A) 10 µC/cm2 and (B)–10 µC/cm$^2$.

The presence of nonpolar domains is expected to provide nanoscale confinements for ionic moieties; such confinement could lead to reduced electrostatic repulsions between like charges, therefore permitting a more compact packing of ions. To test this, the integrated charge densities for both [bmim][BF$_4$] and [bmim][AOT] (FIGS. 13 A and B) were calculated. It can be seen that [bmim][AOT] stored significantly more charges than [bmim][BF$_4$]. Notably, the quantities of integrated charges that [bmim][AOT] stored were equal to the surface charge densities on the electrodes.

Further, the theoretical capacitances of [bmim][AOT] and [bmim][BF$_4$] were calculated from the charge distribution profiles obtained by MD simulations, using the Poisson equation to convert the charge distribution to the potential distribution. The theoretical capacitance was then calculated by dividing the surface charge density by the potential difference between the electrode surface and the bulk electrolyte phase ($\varphi_s-\varphi_b$). The results are summarized in Table 3. It can be seen that in the case of a positively charged electrode, there was a two-fold enhancement in the capacitance when comparing [bmim][AOT] to [bmim][BF$_4$], and in the case of a negatively charged electrode, there was a five-fold enhancement in the capacitance

TABLE 3

Theoretical Capacitances of [bmim][AOT] and [bmim][BF$_4$] calculated from the Molecular Dynamics Simulations.

| Compound | Charge/μC/cm$^2$ | $\varphi_s - \varphi_b$/V | Capacitance/μF/cm$^2$ |
|---|---|---|---|
| [bmim][BF$_4$] | +10 | 2.12 | 4.7 |
| [bmim][AOT] | +10 | 0.95 | 10.5 |

TABLE 3-continued

Theoretical Capacitances of [bmim][AOT] and [bmim][BF$_4$] calculated from the Molecular Dynamics Simulations.

| Compound | Charge/μC/cm$^2$ | $\varphi_s - \varphi_b$/V | Capacitance/μF/cm$^2$ |
|---|---|---|---|
| [bmim][BF$_4$] | −10 | 0.99 | 10 |
| [bmim][AOT] | −10 | 0.18 | 55.5 |

Example 4: Electrochemical Studies of Additional Ionic Liquids

Figure 14:
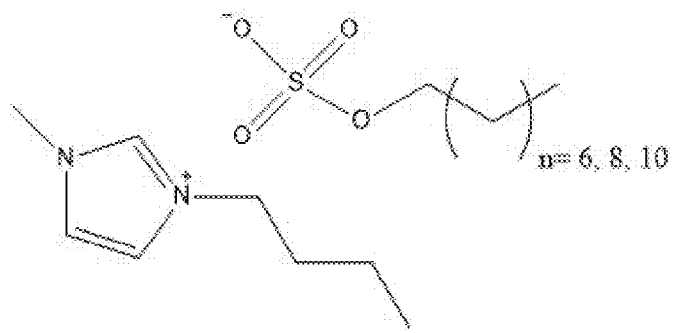
FIG. 14 shows the ionic liquids studied in Example 4.

Studies were performed on [bmim][C$_8$SO$_4$], [bmim][C$_{10}$SO$_4$], and [bmim][C$_{12}$SO$_4$] respectively, as depicted in FIG. 14.

Synthesis was achieved as described above with respect to [bmim][AOT]. Structures were confirmed via $^1$H NMR, elemental analysis, mass spectrometry, and Karl Fischer Analysis. Physical properties of the samples are listed in Table 4. Their melting points are not as low as the AOT analogue most probably due to a decrease in the degree of symmetry. However, their degradation temperatures are significantly higher at around 300° C. (Table 4).

TABLE 4

Melting points, degradation temperature and viscosity (at 25° C.) of the three ionic liquids.

| Ionic Liquid | m.p./° C. | T$_{deg}$/° C. | η/(cP) |
|---|---|---|---|
| [bmim][C$_8$SO$_4$] | <−20 | 313 | 33 |
| [bmim][C$_{10}$SO$_4$] | 44 | 315 | 36 |
| [bmim][C$_{12}$SO$_4$] | 52 | 325 | 110 |

Viscosity was again studied and again the ionic liquids all demonstrated Newtonian behavior. Measurements were conducted between 80° C.-120° C. so that all the ionic liquids were well above their melting points. Viscosity at this temperature is low.

Figure 15:
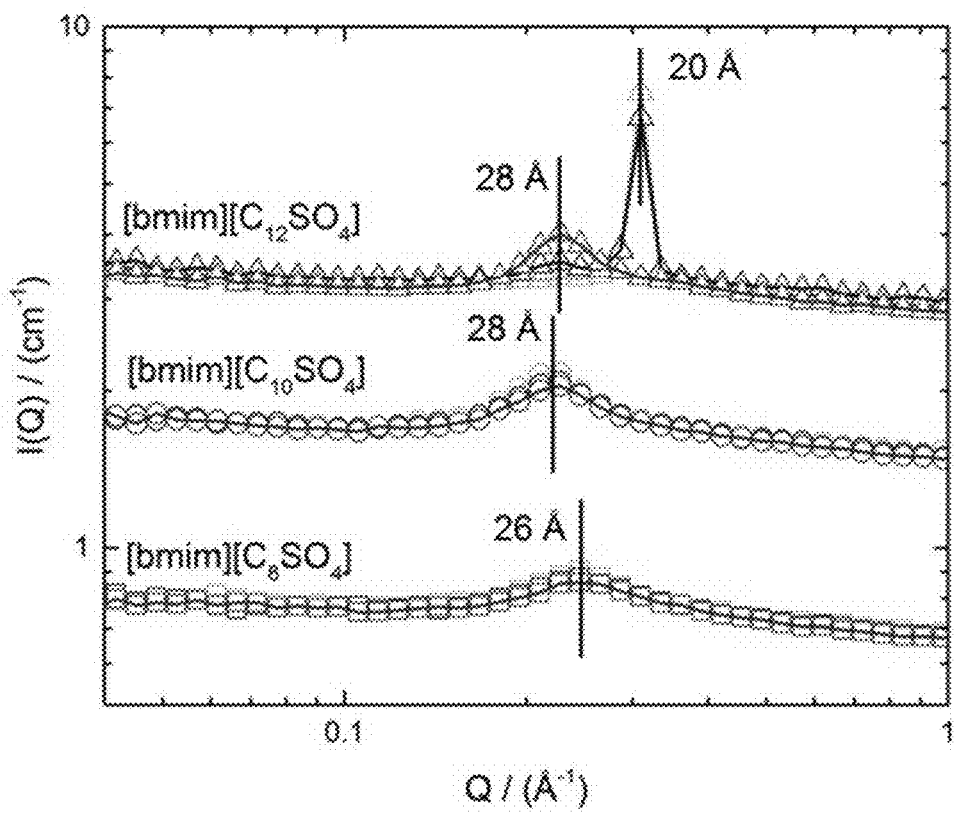
FIG. 15 shows SANS profiles for the three ionic liquids depicted in FIG. 15 as a function of temperature. Light gray=25° C., black=50° C., medium gray=80° C. Peaks at 20 Å are observed for [bmim][C$_{12}$SO$_4$] for 25° C. and 50° C., but not at 80° C. The peaks at 20 Å are not observed in [bmim][C$_{10}$SO$_4$] or [bmim][C$_8$SO$_4$]. The peak at 20 Å in [bmim][C$_{12}$SO$_4$] that appears at 50° C. and 80° C. does not appear at 25° C.

Each compound exhibited a Bragg Peak commensurate with the length of the anion tail, as evidenced by small-angle neutron scattering (SANS). The position of the Bragg peak was not altered with temperature (up to 80° C.). The change for [bmim][C$_{12}$SO$_4$] is simply due to a change upon melting (FIG. 15).

Blending surfactants or IL-surfactants together with conventional ionic liquids can also lead to significant enhancement in capacitance (Table 5). At low temperature and fast scan rates [bmim][BF$_4$] outperforms [bmim][AOT]. However, by mixing a structured IL with a conventional IL (c.f. [bmim][BF$_4$]/[bmim][AOT] at 50:50 wt %, Table 5) the charge that can be stored is much greater (almost double) even at fast scan rates (0.1 Vs$^{-1}$). This is due to a decrease in viscosity combined with the ability of the [bmim][AOT] to still be able to form a lamella-like phase. This allows the ILs of the present invention to outperform both at all temperatures and scan rates. An addition is also to include a conventional surfactant, Na-AOT, in a conventional IL. The addition of only 2 wt % Na-AOT into [bmim][BF$_4$] increases the charge that can be stored, again due to structuring of the surfactant. This allows for a very cheap method of enhancing performance whilst still employing cheap, commercially available materials (both IL and surfactant).

TABLE 5

Charge and electric flux density of various IL mixtures as a function of scan rate at 25° C.

| Compound | Scan Rate (V/s) | Charge (mC) | Electric Flux Density ($\mu$C/cm$^2$) |
|---|---|---|---|
| [bmim][BF$_4$] | 0.1 | 5.572 | 0.071 |
| [bmim][AOT] | 0.1 | 1.029 | 0.013 |
| [bmim][BF$_4$]/Na-AOT (98:2) | 0.1 | 6.302 | 0.081 |
| [bmim][BF$_4$]/[bmim][AOT] (50:50) | 0.1 | 9.290 | 0.119 |
| [bmim][BF$_4$] | 0.05 | 6.145 | 0.788 |
| [bmim][AOT] | 0.05 | 1.877 | 0.242 |
| [bmim][BF$_4$]/Na-AOT (98:2) | 0.05 | 7.752 | 0.099 |
| [bmim][BF$_4$]/[bmim][AOT] (50:50) | 0.05 | 11.595 | 0.149 |

REFERENCES

1. D. Pech, D. Guay, T. Brousse, D. Bélanger, Electrochem. Solid State Lett., 2008, 11, A202.
2. K. Fic, G. Lota, E. Frackowiak, Electrochem Acta, 2012, 60, 206.
3. A. A. Kornyshev, J. Phys. Chem. B, 2007, 111, 5545.
4. V. Lockett, M. Horne, R. Sedev, T. Rodopoulos, J. Ralston, Phys. Chem. Chem. Phys., 2010, 12, 12499.
5. P. Simon, A. Burke, Nanostructured carbons: Double-Layer capacitance and more, 2008.
6. P. Brown, C. P. Butts, J. Eastoe, D. Fermin, I. Grillo, H. Lee, D. Parker, D. Plana, R. M. Richardson, Langmuir, 2012, 28, 2502.
7. R. Lin, P. Taberna, S. Fantini, V. Presser, C. R. Pérez, F. Malbosc, N. L. Rupesonghe, K. B. K. Teo, Y. Gogotsi, P. Simon, J. Phys. Chem. Lett., 2011, 2, 2396.
8. X. Zhu, Y. Lu, C. Peng, J. Hu, H. Liu, Y. Hu, J. Phys. Chem. B, 2011, 115, 3949-3958.
9. A. Triolo, O. Russina, H. Bleif, E. Di Cola, J. Phys. Chem. B, 2007, 111, 4641.
10. L. G. Chen, H. Bermudez, Langmuir, 2012, 28, 1157.
11. P. Brown, C. Butts, R. Dyer, J. Eastoe, I. Grillo, F. Guittard, S. Rogers, R. Heenan, Langmuir, 2011, 27, 4563.

All US and PCT patent application publications and US patents mentioned herein are hereby incorporated by reference in their entirety as if each individual patent application publication or patent was specifically and individually indicated to be incorporated by reference. In case of conflict, the present application, including any definitions herein, will control.

EQUIVALENTS

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

The invention claimed is:

1. A capacitor, comprising a first ionic liquid and a second ionic liquid; wherein the first ionic liquid comprises an anion that is a surface-active agent;
    provided that the first ionic liquid is not [bmim][AOT]; and
    the second ionic liquid is [bmim][AOT].

2. The capacitor of claim 1, wherein the first ionic liquid comprises an anion selected from the group consisting of AOT, $C_3$-$C_{24}$ alkylsulfate anions, $C_3$-$C_{24}$ alkylsulfonate anions, $C_3$-$C_{24}$ alkylcarboxylate anions, $C_3$-$C_{24}$ alkylphosphate anions, or $C_3$-$C_{24}$ alkylphosphonate anions.

3. The capacitor of claim 2, wherein the first ionic liquid comprises an $C_3$-$C_{24}$ alkylsulfate anion or a $C_3$-$C_{24}$ alkylsulfonate anion.

4. The capacitor of claim 3, wherein the first ionic liquid comprises octylsulfate, decylsulfate, dodecylsulfate, or dodecylsulfonate.

5. The capacitor of claim 1, wherein the first ionic liquid further comprises a cation selected from the group consisting of bmim cation, pyridinium cations, pyrrolidinium cations, pyrazolium cations, phosphonium cations, ammonium cations, and sulfonium cations.

6. The capacitor of claim 5, wherein the first ionic liquid comprises bmim.

7. The capacitor of claim 6, wherein the first ionic liquid is [bmim][octylsulfate], [bmim][decylsulfate], or [bmim][dodecylsulfate].

8. The capacitor of claim 1, wherein the first ionic liquid further comprises a cation selected from the group consisting of polyimidazolium cations, poly(alkylammonium) cations, and poly(allyldimethylmmonium) cations.

9. A method of using a capacitor of claim 1, comprising applying a potential to the capacitor.

10. The method of claim 9, wherein the capacitor is at a temperature in the range from about −30° C. to about 90° C.

11. The method of claim 9, wherein the capacitor is at a temperature in the range from about 90° C. to about 250° C.

12. The method of claim 9, wherein the capacitor is at a temperature in the range from about 150° C. to about 250° C.

13. A capacitor, comprising a first ionic liquid; wherein the first ionic liquid comprises a cation that is a surface-active agent; and
    the first ionic liquid comprises bis(trifluoroethanesulfonyl)amide;
    provided that the first ionic liquid does not comprise [bmim][AOT].

14. The capacitor of claim 13, wherein the first ionic liquid comprises a cation selected from the group consisting of bmim cation, pyridinium cations, pyrrolidinium cations, pyrazolium cations, phosphonium cations, ammonium cations, and sulfonium cations.

15. The capacitor of claim 14, wherein the first ionic liquid comprises bmim.

16. The capacitor of claim 13, wherein the first ionic liquid comprises a cation selected from the group consisting of polyimidazolium cations, poly(alkylammonium) cations, and poly(allyldimethylmmonium) cations.

17. The capacitor of claim 13, wherein the capacitor further comprises a second ionic liquid.

18. The capacitor of claim 17, wherein the second ionic liquid comprises an anion selected from the group consisting of AOT, $C_3$-$C_{24}$ alkylsulfate anions, $C_3$-$C_{24}$ alkylsulfonate anions, $C_3$-$C_{24}$ alkylcarboxylate anions, $C_3$-$C_{24}$ alkylphosphate anions, or $C_3$-$C_{24}$ alkylphosphonate anions.

19. The capacitor of claim 17, wherein the second ionic liquid comprises an $C_3$-$C_{24}$ alkylsulfate anion or a $C_3$-$C_{24}$ alkylsulfonate anion.

20. The capacitor of claim 17, wherein the second ionic liquid comprises octylsulfate, decylsulfate, dodecylsulfate, or dodecylsulfonate.

21. The capacitor of claim 17, wherein the second ionic liquid comprises AOT or a tetrafluoroborate anion.

22. The capacitor of claim 17, wherein the second ionic liquid comprises a sodium cation or a bmim cation.

23. A method of using a capacitor of claim 13, comprising applying a potential to the capacitor.

24. The method of claim 23, wherein the capacitor is at a temperature in the range from about −30° C. to about 90° C.

25. The method of claim 23, wherein the capacitor is at a temperature in the range from about 90° C. to about 250° C.

26. The method of claim 23, wherein the capacitor is at a temperature in the range from about 150° C. to about 250° C.

27. A capacitor, comprising a first ionic liquid and a second ionic liquid; wherein the first ionic liquid comprises a cation that is a surface-active agent;

provided that the first ionic liquid is not [bmim][AOT]; and the second ionic liquid is [bmim][AOT].

28. A method of using a capacitor of claim 27, comprising applying a potential to the capacitor.

29. The method of claim 28, wherein the capacitor is at a temperature in the range from about −30° C. to about 90° C.

30. The method of claim 28, wherein the capacitor is at a temperature in the range from about 90° C. to about 250° C.

31. The method of claim 28, wherein the capacitor is at a temperature in the range from about 150° C. to about 250° C.

* * * * *